United States Patent [19]

Bengtsson et al.

[11] Patent Number: 5,626,894
[45] Date of Patent: May 6, 1997

[54] PROCESS FOR THE PRODUCTION OF A FLAVORING AGENT

[75] Inventors: Bengt Bengtsson, Seuzach, Switzerland; Sunil Kochhar, New Milford, Conn.; Eric Raetz, Lausanne; Jaak J. Sihver, Gutenswil, both of Switzerland

[73] Assignee: Nestec S.A., Vevey, Switzerland

[21] Appl. No.: 573,048

[22] Filed: Dec. 15, 1995

[30] Foreign Application Priority Data

Dec. 16, 1994 [EP] European Pat. Off. .............. 94119932

[51] Int. Cl.$^6$ ....................................................... A23L 1/00
[52] U.S. Cl. ................... 426/62; 426/7; 426/11; 426/19; 426/28; 426/534; 426/650
[58] Field of Search ................................. 426/19, 62, 7, 426/11, 28, 29, 31, 61, 533, 534, 538, 650

[56] References Cited

FOREIGN PATENT DOCUMENTS

| 1013972 | 12/1965 | European Pat. Off. . |
| 039415A1 | 4/1981 | European Pat. Off. . |
| 417481A1 | 8/1990 | European Pat. Off. . |
| 429760A1 | 8/1990 | European Pat. Off. . |

OTHER PUBLICATIONS

Ogawara, Patent Abstracts of Japan, Abstracting 02–255071, Oct. 1990.

Shiotsuki, Patent Abstracts of Japan, Abstracting 03–247265, Nov. 1991.

Takeda, Patent Abstracts of Japan, Abstracting 04–40882, Feb. 1992.

Nagodawithana, Tilak; "Yeast–Derived Flavors and Flavor Enhancers and Thier Probable Mode of Action", Food Technology, vol. 46, No. 11, Nov. 1992 Chicago, U.S. pp. 138, 140–142, 144.

"Database WPI", Section Ch, Week 8044, Derwent Publications Ltd., London, GB; Class 27, AN 86–241842 & J–A–55 120 788 (Toyobo), 18 Sep. 1980.

"Database WPI", Week 86 Derwent Publications Ltd., London, GB; Class37, AN 86–241842 & JP–A–61 170 363 (Chugai Boeki), 1 Aout 1986.

*Primary Examiner*—Leslie Wong
*Attorney, Agent, or Firm*—Pennie & Edmonds

[57] ABSTRACT

Process for the production of a flavoring agent, in which a yeast lysate is mixed with moromi or a moromi fraction, and the mixture is allowed to react at 30°–70° C. in order to convert the AMP of the lysate to IMP.

16 Claims, No Drawings

PROCESS FOR THE PRODUCTION OF A FLAVORING AGENT

TECHNICAL FIELD

The subject of the present invention is a process for the production of a flavoring agent.

BACKGROUND ART

Yeast extracts are widely used as flavoring agents for soups, meat-based products, sauces, for example. Among the key flavor components of these extracts are especially guanosine 5'-monophosphate (GMP) and inosine 5-monophosphate (IMP), the latter being a major nonvolatile compound used to enhance the flavor of meat-based products. IMP is derived from the oxidative deamination of adenosine 5'-monophosphate (AMP). This reaction is catalysed by an enzyme called adenosine monophosphate deaminase which is found in many eukaryotic or prokaryotic microorganisms, and especially in certain moulds of the genus Aspergillus.

JP 53018773 describes the conversion of the AMP of a yeast lysate to IMP by an adenosine monophosphate deaminase isolated from an *Aspergillus niger* from a koji culture.

JP 55120788 also describes the presence of an adenosine monophosphate deaminase in certain halophilic microorganisms, especially Torulopsis or Candida. Unfortunately, this deaminase exhibits thermal instability from 40° C. and a relatively low enzymatic activity, which makes its industrial use particularly difficult.

In addition, it is known that the method for the preparation of a traditional soya sauce has two fermentation stages involving an Aspergillus and a halophilic mircoorganism respectively. EP 417481 thus describes a process for the preparation of a fermented soya sauce, in which a koji is prepared by fermentation, with a koji culture, of a mixture of cooked soya and roasted wheat, the koji is hydrolysed in an aqueous suspension for 3–8 h at 45°–60° C. with the enzymes produced during the fermentation with the koji culture, a moromi is prepared by adding sodium chloride to the hydrolysed koji suspension, the moromi is fermented by a halophilic microorganism, it is pressed, a liquid is recovered from the pressed moromi or cake, this liquid is pasteurized and it is clarified in order to remove the sediment.

SUMMARY OF THE INVENTION

The present invention relates to the direct use of a traditional moromi or fraction thereof to convert the AMP of a yeast lysate to IMP.

To this end, in the process for the production of a flavoring agent according to the present invention, a yeast lysate is mixed with moromi or a moromi fraction, and the mixture is allowed to react at 30°–70° C. in order to convert the AMP of the lysate to IMP.

Indeed, it has been observed surprisingly that a moromi has a deaminase activity which is of industrial interest, even if it is not fermented by a halophilic microorganism producing an adenosine monophosphate deaminase, as described above.

Furthermore, the adenosine monophosphate deaminase activity of the moromi is derived from that of the koji culture, which is relatively surprising, because the koji culture is fermented by halophilic microorganisms at high salt concentrations for several weeks, or even several months. Indeed, it is surprising that the deaminase of the koji culture effectively withstands such fermentation conditions, because the salt content is quite capable of denaturing it, and the fermentation ought in fact to hydrolyse it.

The present process has, in addition, the advantage that the source of adenosine monophosphate deaminase used is very economical, since the moromi is traditionally produced in a very large quantity in a large number of countries.

Another advantage lies in the fact that it is not necessary to isolate the deaminase, but that a moromi or one of its fractions which have a high salt content can be directly added to a yeast extract, and in spite of that obtain nevertheless a conversion yield greater than 50%, or even greater than 80%. It is even possible according to the present process to obtain a conversion level of at least 50% in a mixture comprising more than 50% of a powdered yeast extract, that is to say a mixture which is particularly viscous, or even pasty, which is particularly surprising.

Another advantage lies in the fact that the cake derived from the moromi is generally discarded. The value of a waste product which causes problems of pollution due in particular to its high salt content is therefore enhanced.

Furthermore, the sediments in the liquid extracted from the moromi, which are traditionally reintroduced at the beginning of the fermentation of the moromi, may now be used as raw material in the process for flavoring a yeast extract according to the present invention. It is also surprising that the adenosine monophosphate deaminase activity is very well preserved in the sediment.

DETAILED DESCRIPTION OF THE PREFERRED EMBODIMENTS

In the present text, the term "koji" designates the product of the fermentation, with a koji culture, of a mixture of a source of proteins and of a source of carbohydrates, especially of a mixture of a leguminous plant or of a cooked oleaginous plant and of a cooked or roasted cereal source, for example of a mixture of soya or cooked beans and of cooked or roasted wheat or rice. This culture is furthermore derived from a culture of koji spores as can be obtained commercially especially in Japan and in China, which comprises in particular *Aspergillus oryzae* or *Aspergillus soyae* spores.

Likewise, the term "moromi" designates a mixture of at least one koji and of a brine, within the framework of a traditional preparation of a soya sauce, which is fermented for several weeks or even several months, by a culture of halophilic microorganisms which are producers of flavor substances, such as certain *Candida versatilis, Torulopsis etchelsii, Saccharomyces rouxii* or *Pediococcus halophilus*, for example. A moromi may therefore also be a fermented mixture of koji, a brine and a material rich in protein and/or in carbohydrates as described in EP 429760, for example.

Finally, in the remainder of the description, the term "deaminase" can be used in the sense of adenosine monophosphate deaminase. Furthermore, the percentages are given by weight, unless otherwise stated.

In the present process according to the invention, it is therefore sought to convert the AMP of a yeast lysate to IMP. For that, there may be chosen as yeast lysate a suspension of hydrolysed yeasts or a powdered yeast extract prepared traditionally from yeasts of the genus Saccharomyces, Candida, Kluvveromyces, Torula or Zymomonas, for example.

A lysate in the form of a suspension of hydrolysed yeasts may thus have a dry matter content of the order of 5 to 50%, for example, and may be conventionally prepared by mixing a commercially available powdered yeast extract with water, or may also be prepared by hydrolysing a suspension of fresh yeasts, that is to say live yeasts, by plasmolysis and/or autolysis, optionally enhanced by the addition of proteases (see EP 39415, for example).

Furthermore, a lysate in the form of a powdered yeast extract may also be directly mixed with a moromi or one of its fractions in order to convert the AMP of the lysate to IMP. Such a yeast powder may be obtained from a supplier of yeast extracts or prepared by drying under vacuum a suspension of hydrolysed yeasts, for example.

A lysate of particular interest for implementing the present process preferably comprises at least 0.5% of AMP by weight of dry matter. It is possible to obtain such a lysate directly from a supplier, or alternatively to obtain it by subjecting a lysate, during its preparation or otherwise, to a digestion with nucleases, especially phosphodiesterases such as 5'-ribonucleases, for example. To do this, it is thus possible to add to a suspension of yeasts a malt rootlet extract known to contain these enzymes, or a microbial phosphodiesterase obtained for example from *Penicillium citrinum*, and then to allow the whole mixture to react for a sufficient time, at 30°–70° C., until a partial or complete degradation of the RNA into its monomers is obtained, for example.

Likewise, a lysate of particular interest for implementing the present process may comprise less than 20% of salts by weight of dry matter, for example, preferably less than 10%, or even 5%, this so as not to partially inhibit the activity of the deaminases in the present process. Such a lysate may thus be obtained directly from a supplier, or alternatively may be obtained by washing a powdered yeast extract so as to remove the salts from it, and then by drying it conventionally, for example.

In order to implement the present process, a moromi or a moromi fraction is therefore used to convert the AMP of a yeast lysate to IMP.

The moromi may be obtained by any of the traditional methods known for the preparation of a soya-based sauce, it being possible for the moromi to comprise, however, more than 2% by weight of koji relative to the moromi dry matter. It should be noted that it is surprising that only 2% of koji is sufficient to obtain a deaminase activity from the moromi or from its fractions which is of interest for the present process.

Furthermore, the moromi fraction may be any solid and/or liquid part of the moromi which may be separated by conventional technical means such as pressing, a filtration and/or a clarification, for example. Thus the moromi fraction used in the present process may be the cake derived from the moromi, and/or the liquid derived from the moromi, and/or this clarified liquid, and/or the sediments from this liquid, and/or an aqueous extract from the cake, for example. It should be noted that it is not sought in the present process to obtain a moromi fraction containing the purified deaminase, but that only fractions which are conventionally separated during a traditional manufacture of a soya-based sauce as described above are used, for example.

The cake derived from the moromi is in fact the insoluble part of the moromi, comprising salts and fermented residues of carbohydrates and proteins. This may be obtained simply by pressing the moromi with the aid of a press or a filter press, or by centrifugation for example, in order to give a cake generally comprising at least 50% of dry matter. This cake may therefore be finally directly added to a yeast lysate in order to convert the AMP therefrom to IMP; however, grinding the cake into small pieces before adding it to the yeast lysate is preferred.

The adenosine monophosphate deaminases contained in the cake may also be extracted from the latter, it being possible for the said extract to then be directly added to the yeast lysate. For that, an aqueous extract of the cake may be produced by mixing 1 part of the cake with 0.5–10 parts of water, and then by filtering the whole mixture. The filtrate or extract may then be directly added to a yeast lysate, or may be concentrated beforehand by evaporation or ultrafiltration before being added thereto, or alternatively may be freeze-dried and then resuspended in water before being added thereto, for example. The extract may therefore also be preserved in a concentrated or dried form, before being used to implement the present process.

It is also advantageous to add beforehand to the water/cake mixture an enzyme which reduces its viscosity, so as to promote the extraction of the deaminase. It is thus possible to add to this mixture an enzymatic preparation, especially a mixture of carbohydrases marketed under the trade mark Viscozyme® (Novo Nordisk, Denmark), and to allow the whole mixture to react for 1 to 5 h, with stirring, before filtering it, for example.

Likewise, the liquid derived from the moromi may also be directly added to the yeast lysate. This liquid generally contains at least 30% of dry matter of which 40–60% is in the form of salts, and 2–5% is capable of sedimenting after several days. It is therefore preferable to allow this liquid to stand for 1 to 7 days, so that the insolubles not discarded during pressing or centrifugation can sediment, to clarify it by passing it through a filter paper, and then to add it directly to the yeast lysate.

Finally, the sediments from the liquid derived from the moromi have a particularly high deaminase activity. These sediments, which are generally reintroduced into the moromi before fermentation, can therefore now be added directly to a yeast lysate.

In order to implement the present process,. 1–30% of cake or of sediment, 10–50% of moromi, or 5–50% of liquid derived from the moromi may thus be mixed with a yeast suspension comprising 5–50% of hydrolysed yeast dry matter, for example.

Likewise, 50–90% of an aqueous cake extract may be directly mixed with a powdered yeast extract, for example.

Finally, it is possible to allow the lysate/moromi or lysate/moromi fraction(s) to react at 30°–70° C. for 10 min to 6 h, then to inactivate it thermally by heating it at 80°–100° C. for 10 to 30 min, and then, where appropriate, to filter it if it contains solid residues of sediment or of cake, for example. A yeast flavor suspension is thus obtained which is quite suitable for seasoning meat-based products, especially sauces and soups, for example.

It is also possible to dry the inactived suspension in a traditional manner, for example by vacuum drying or freeze-drying, and thus to obtain a yeast powder which may also be used as flavoring agent for meat-based products, for example.

The rate of conversion of the yeast lysate AMP to IMP which is obtained by the present process may be of at least 50%, and most often of at least 80%, for example.

EXAMPLES

The process according to the present invention is described in greater detail in the examples presented by way of illustration. The percentages are given therein by weight, unless otherwise stated. These examples are preceded by a characterization of the adenosine monophosphate deaminase activity of some moromi fractions.

Characterization of the deaminase activity

A traditional moromi fermented by a yeast *Candida versatilis* for 15 days is prepared as described in Example 1 of Patent EP 429760, with the difference that the moromi comprises 15% by weight of koji relative to the moromi dry matter. The moromi is then pressed with the aid of a hydraulic press and a cake and a liquid are recovered.

A series of enzymatic extracts are then prepared from the cake described above. For that, the latter is resuspended (10% weight/volume) in several buffered media having a pH of between 4 and 9, they are mixed for 2 h and they are centrifuged at 20,000 g for 30 min at 4° C., and then the supernatants are recovered.

Likewise, a first series of enzymatic extracts of the liquid described above is prepared by diluting from 2 to 20 fold, with one of the above buffer solutions having a pH of 5.

The adenosine monophosphate deaminase activity of each of these extracts is then tested by measuring the release of ammonium hydroxide with the Nessler reagent, according to the method described by E. A. Bruns et al. (The analytical chemistry of nitrogen and its compounds, 51, Wiley-Interscience, New York, 1970). In a conventional manner, a mixture comprising a solution of 100 mM AMP and one of the enzymatic extracts of the cake (400 µl/100 µl) or one of the enzymatic extracts of the liquid (480 µl/20 µl) is thus incubated at 37° C. for 10 min, then the reaction is stopped by adding 500 µl of a solution at 0.5N $H_2SO_4$. 5 ml of distilled water and 1 ml of Nessler reagent are then added to the mixture, and the optical density is then measured at 430 nm. The quantity of ammonium hydroxide produced is calculated with the aid of a calibration curve established under the same conditions, with known concentrations of ammonium nitrate.

The optimum activity of the deaminase is around pH 5 and 6, and at a temperature of about 60° C. These two values are identical to those exhibited by a deaminase from a koji culture, whereas those of yeast deaminases are manifestly different, of the order of pH 7 and 40° C. (Yoshino et al., Biochemica et Biophysica Acta, 570, 1979, 157–166; JP 55120788). This therefore suggests that the deaminase activity of the moromi has its origin in the koji.

Finally, the deaminase of the cake or of the liquid exhibits a maximum enzymatic rate Vmax (expressed in micromole of ammonium hydroxide produced per min and per g of enzyme preparation) and a Km (expressed in millimole) which is very similar to those observed for a deaminase from a traditional koji culture. Table 1 below presents the biochemical properties of this deaminase, determined by the method above, in comparison with those of the deaminase from the koji culture which served to prepare the moromi described above, and also in comparison with those of a yeast deaminase.

Examples 1 to 8

A traditional moromi fermented by a yeast *Candida versatilis* for 15 days is prepared as described in Example 1 of Patent EP 429760, with the difference that the moromi comprises 15% by weight of koji relative to the moromi dry matter, and 35% of dry matter of which 42% is in the form of salts.

A portion of this moromi is then pressed by a traditional hydraulic filter press. A cake is thus obtained comprising 65% of dry matter of which 12% is in the form of salts, and a liquid comprising 30% of dry matter of which 50% is in the form of salts and 3% is capable of sedimenting.

A portion of the liquid is then allowed to stand for 3 days, and is then clarified through a filter. A clarified liquid is thus obtained comprising 29% of dry matter, and sediments on the filter comprising 50% of dry matter.

Next, several mixtures are prepared comprising a quantity of commercially available powdered yeast containing 2% AMP by weight of dry matter and about 20% of salts by weight of dry matter (Biospringer EXL2003, France), another quantity of water, and yet another quantity of moromi, or of cake, or of pressed liquid, or of clarified liquid or of sediment, depending on the tests. To do this, the powdered yeast extract is first mixed with water, it is supplemented with moromi or one of its fractions, then the whole mixture is allowed to react, with stirring, for a time and at a temperature sufficient to observe conversion of the AMP of the extract to IMP. Next, after deamination, the deaminases are inactivated by heating each mixture at 95° C. for 20 min, then they are filtered, where appropriate, if they comprise residues of cake or of sediment.

Finally, each inactivated mixture is dried under vacuum in a traditional manner, or even, where appropriate, filtered, then its AMP and IMP content is measured by the following chromatographic method.

Analysis of the nucleotides is performed by means of a high-performance chromatographic system of the Waters HPLC type (millipore, Switzerland) equipped with an automatic injector WISP 710B, with two Waters 510 pumps and with a Waters 680 automatic gradient controller. The separation of the nucleotides is performed at room temperature, on Vydac RP C18 type columns (P. Bucher, Switzerland). The mobile phase consists of two eluents: a 20 mM solution of triethylamine (solvent A) and a solution containing 20 mM triethylamine and 50% (v/v) acetonitrile (solvent B).

The samples to be analysed, as well as the eluents, are prefiltered on a Nylaflo membrane (Gelman; U.S.) with a

TABLE 1

| Source of the adenosine monophosphate deaminase | Optimum pH | Optimum temperature (°C.) | Km (mM) | Vmax (µmol/min/g) |
| --- | --- | --- | --- | --- |
| Koji | 5–6 | 60 | 1.47 | 7.94 |
| Liquid pressed from the moromi | 5–6 | 60 | 1.58 | 0.69 |
| Cake from the moromi | 5–6 | 60 | 1.72 | 1.02 |
| Yeast (Yoshino, 1979) | 6.5–7.5 | 40 | 0.02 | 350–500 |

All these results therefore clearly indicate that the deaminase activity of the moromi and of its fractions has its origin in the koji, which is surprising, because indeed the fermentation of the moromi did not destroy this activity.

porosity of 0.22 µm. The chromatography is performed at a speed of 1 ml/min by a first elution phase of 10 min duration with 100% of solvent A, then a second phase of 40 min where the proportion of solvent B increases to 15%, and finally a third phase of 10 min with 100% of solvent B. A measurement of the content of nucleotides is performed by absorption spectrophotometry at 254 nm. The quantification of the absorption peaks involves reference solutions containing known quantities of nucleotides. The identity of the peaks is confirmed by co-eluting reference nucleotides with samples to be measured (so-called spiking technique) and by controlling the absorption spectra corresponding to the different peaks obtained, with the aid of an HP8452A type spectrophotometer (Hewlett-Packard).

The results and the deamination conditions for each example are illustrated in Table 2 below. The powdered yeast extract initially contains 97% of dry matter, 2% of AMP and 0% of IMP.

TABLE 2

| Example | Yeast extract (%) | Moromi or Moromi fraction (%) | Water (%) | Deamination conditions | Nucleotides in the final powdered yeast extract (%) |
|---|---|---|---|---|---|
| 1 | 20 | Moromi: 35 | 45 | 52° C.; 3 h | AMP 0.16; IMP 1.60 |
| 2 | 20 | Cake: 1 | 79 | 54° C.; 4 h | AMP 0.30; IMP 1.71 |
| 3 | 20 | Cake: 10 | 70 | 54° C.; 4 h | AMP 0.01; IMP 1.80 |
| 4 | 20 | Pressed liquid: 20 | 60 | 50° C.; 4 h | AMP 0.19; IMP 1.23 |
| 5 | 20 | Pressed liquid: 30 | 50 | 50° C.; 4 h | AMP 0.2; IMP 1.30 |
| 6 | 20 | Clarified liquid: 30 | 55 | 50° C.; 4 h | AMP 0.3; IMP 1.20 |
| 7 | 20 | Sediments: 1 | 79 | 54° C.; 4 h | AMP 0.15; IMP 1.7 |
| 8 | 20 | Sediments: 10 | 70 | 54° C.; 4 h | AMP 0.1; IMP 1.83 |

Examples 9 to 11

In these examples, the same moromi and the same moromi fractions as those described in Examples 1 to 8 are used. On the other hand, a commercially available powdered yeast extract comprising less than 3% of salt is used (Biospringer, EXL2000 without salt, France).

The conversion of the lysate AMP or IMP is then performed according to the process of the present invention. To do this, a water/powdered yeast extract mixture is supplemented with a quantity of pressed liquid or of clarified liquid or of sediment, according to the examples. Then each mixture is treated as described in Examples 1 to 8.

Table 3 below illustrates the results and the deamination conditions for each example. The initial powdered yeast extract comprises 1% of AMP and 0% of IMP.

TABLE 3

| Example | Yeast extract (%) | Moromi or Moromi fraction (%) | Water (%) | Deamination conditions | Nucleotides in the final powdered yeast extract (%) |
|---|---|---|---|---|---|
| 9 | 40 | Pressed liquid: 40 | 20 | 50° C.; 4 h | AMP 0.14; IMP: 0.58 |
| 10 | 20 | Clarified liquid: 40 | 40 | 50° C.; 4 h | AMP 0.01; IMP 0.52 |
| 11 | 40 | Sediment: 5 | 55 | 50° C.; 4 h | AMP 0.33; IMP 0.37 |

As can be seen in the above table, a salt-free yeast extract makes it possible to increase, in the present process, the respective proportions of yeast powder and of moromi fraction, without however interfering with the rate of conversion of the AMP to IMP.

Examples 12 to 14

In Examples 12 and 13, the deaminases contained in the cake described in Examples 2 and 3 are extracted. For that, 1 part of cake is mixed with 5 parts of water at 50° C. In the case of Example 13, 0.1% of Viscosyme® is added to the water/cake mixture, it is stirred at 50° C. for 2 h, then it is filtered so as to remove the insoluble residues. The filtrate of the two Examples 12 and 13 is then added to the same yeast lysate as that described in Examples 1 to 8, then each mixture is then treated as described in these examples.

In Example 14, the filtrate of Example 13 is concentrated by evaporation under vacuum until 80% of the water is removed. Then, in order to perform the conversion of the AMP to IMP according to the invention, the concentrated extract is diluted in an amount of 26.6 parts in 23.4 parts of water, it is mixed with the yeast extract described in Examples 9 to 11 under the conditions described in the table below, the mixture is then heated at 95° C. for 20 min, then it is dried under vacuum until a yeast powder is obtained in which the content of nucleotides is determined.

Table 4 below illustrates the results and the deamination conditions for each example.

TABLE 4

| Example | Yeast extract (%) | Aqueous extract of the cake (%) | Deamination conditions | Nucleotides in the final powdered yeast extract (%) |
|---|---|---|---|---|
| 12 | 20 | Without Viscosyme® 80 | 54° C.; 4 h | AMP 0.07; IMP 1.80 |
| 13 | 20 | with Viscosyme® 80 | 54° C.; 4 h | AMP 0.1 IMP 1.86 |
| 14 | 50 | concentrated extract 50 | 54° C.; 4 h | AMP 0.53; IMP 0.9 |

We claim:

1. A process for converting adenosine-5'-monophosphate (AMP) to inosine-5'-monophosphate (IMP) for use as a flavoring agent, which process comprises mixing sufficient amounts of a yeast lysate and a moromi or a moromi fraction to form a mixture, allowing the mixture to react at a temperature of between about 30° and 70° C. and for a time sufficient to convert at least a portion of the AMP of the lysate to IMP, thus producing a flavoring agent.

2. Process according to claim 1, in which the lysate is a suspension of hydrolysed yeast or a powdered yeast extract.

3. Process according to claim 1, in which the yeast lysate comprises at least 0.5% of AMP by weight of dry matter.

4. Process according to claim 1, in which the yeast lysate comprises less than 10% of salts by weight of dry matter.

5. Process according to claim 1, which further comprises including the moromi fraction in at least one of the following substances: a cake derived from the moromi, a liquid derived from the moromi, a clarified liquid derived from the moromi; an aqueous extract of the cake, or a mixture thereof.

6. Process according to claim 5, which further comprises preparing the aqueous extract by mixing about 0.5 to 10 parts of water and 1 part of cake, filtering the mixture and recovering the filtrate.

7. Process according to claim 5, wherein about 1 to 30% of said cake or sediment, about 10 to 50% of said moromi, or about 5 to 50% of said liquid derived from the moromi is mixed with a suspension comprising about 5 to 50% of hydrolyzed yeast, said percents calculated on the weight of dry matter.

8. Process according to claim 5, in which about 50 to 90% of an aqueous extract of cake or of sediment is mixed with a powdered yeast extract.

9. Process according to claim 1, wherein the mixture is allowed to react for about 10 min to 6 h, before being thermally inactivated.

10. Process according to claim 9, in which the inactivated mixture is dried.

11. Process according to claim 6, wherein the viscosity of the mixture is reduced by adding an enzyme thereto.

12. Process according to claim 6, wherein the viscosity of the mixture is reduced by adding a carbohydrase thereto.

13. Process according to claim 9, wherein the mixture is inactivated by heating to between about 80° and 100° C. for about 10 to 30 min.

14. Process according to claim 1, wherein the reaction is conducted such that substantially all of the AMP is converted to IMP.

15. Process according to claim 1, wherein the amount of AMP remaining in the mixture is between about 0.01 and 0.33%.

16. The process of claim 6 wherein the viscosity of the water/cake mixture is reduced prior to the filtering step.

* * * * *